Oct. 14, 1947.   W. CULVER   2,429,016
SUPPORT FOR CLASSIFYING SYSTEMS
Filed Feb. 17, 1945
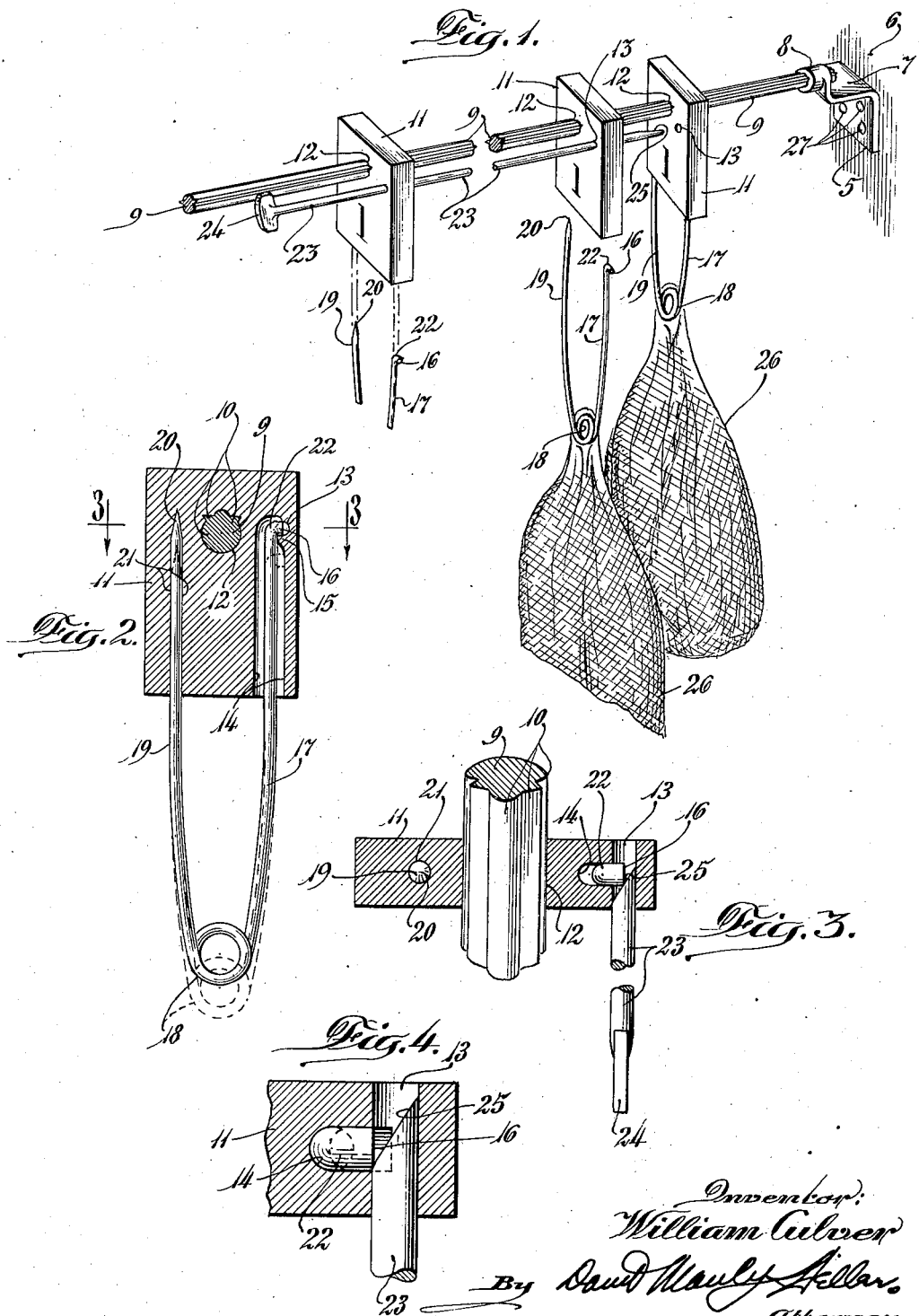

Patented Oct. 14, 1947

2,429,016

UNITED STATES PATENT OFFICE 2,429,016

SUPPORT FOR CLASSIFYING SYSTEMS

William Culver, Chicago, Ill.

Application February 17, 1945, Serial No. 578,534

6 Claims. (Cl. 248—307)

My herein invention appertains to classifying systems to be used primarily in laundries, and dry cleaning establishments.

An important object of my invention is to provide a combination mechanism comprised of a block structure releasably attached to a pin structure, the pin structure being adapted to support an article to be laundered or dry cleaned, or a sack of such materials which are usually segregated into different sacks containing articles of like colors to be simultaneously cleaned, so that the articles will not be affected by the running of colors.

Another object of my invention is to provide a rod mechanism suitably supported which has a combination key-like cross-sectional cut to fit a similarly mating recessed key-hole portion in a guide clip structure to which is removably secured a pin structure adapted to support laundry or dry cleaning sacks or bundles, and a release rod mechanism adapted to release the said pin structure and bundles mounted thereupon.

Another object of my invention is to provide a combination classifying mechanism of the foregoing description which is practical in construction, useful and efficient in its operation, and of such simple elemental structure as to warrant economical manufacture thereof in quantity production.

Other features and advantages inherent in my invention will become apparent from an examination of the accompanying drawings having particular reference and being further elucidated in the ensuing description; where like symbols are used to designate like parts, and in which:

Fig. 1 is a perspective view of the structure essential for carrying out the teachings of my invention.

Fig. 2 is a longitudinal sectional view thru one of the combination clip mechanisms when assembled on the code or combination rod structure.

Fig. 3 is a transversal cross-sectional view taken, substantially, on the line 3—3 of Figure 2.

Fig. 4 is an enlarged fragmentary section similar to Figure 3 showing the releasing means in effective operation.

Referring to the various views, it can be seen that I provide a supporting bracket 5 which is secured to a wall or other similar support 6 by virtue of fastening means 27. The said bracket is, preferably, formed with a right angle flange 7, and integrally therewith is provided a support bushing 8 which is adapted to support a rod generally, designated 9, and which is of a cross-sectional key-like cut similar to the configuration designated by the numeral 10 consisting of a large circular area. a smaller circular portion, and two angular portions which are mated with a key-hole or opening 12 within the clip, generally, designated 11, thus adapting the said clip 11 to be slidably conducted over the said rod 9. The clip 11 is provided with a circular opening 21, and an enlarged opening 14 terminating in a right angular portion merging with the circular opening 13, resulting in a supporting lip 15, the purpose of which will be hereinafter more clearly elucidated.

The pin supporting element for the bundles 26 or article which may be positioned thereon is designated 18, and is of a spring-like construction, having one pin leg 19 terminating in the point 20 so that it may be threaded thru articles to be fastened thereon, and a second leg 17 which terminates in a hook portion 22, the hook portion being adapted to rest on the lip 15 when the pin is inserted with its leg 19 into the opening 21, and the leg 17 into the opening 14, the lower portion of the lip 15 acting to cam inwardly the hook 22 with respect to the leg 17, until it reaches the upper portion of the recess 14 and springs outwardly by virtue of the spring tension confined in the loop portion 18 causing the knee 16 to rest on the lip 15.

When it is desired to release the bundles 26 or any article supported on the pins, the pins and the supporting articles are dropped off by means of the release element 23 which consists of a long rod having a suitable handle 24, and as can be seen in Figures 3 and 4, the tip of the said element 23 has an angular or bevelled portion 25, which when inserted into the opening 13, causes the knee end 16 to be cammed outwardly so that it loses its support on the lip 15, the weight of the bundles 26 causing the entire assemblage to drop off; then the cycle may be repeated when the pin is attached to other bundles and slipped into the proper clip 11 being a suitable combination to fit the rod 9.

The clips in this instance are numbered by a code numeral (I) and all clips fitting over different rod configurations are likewise differently numbered, but all the clips fitting on the same rod are numbered alike. Thus the mechanism makes available a means of passing bundles of laundered or dry cleaned materials to different sections in a plant depending on how the rod equipment is positioned with respect to the various operating stations.

A suitable motivating means may be applied in order to motivate the clips 11 with the weights or bundles secured thereto to be propelled along the line of communication established by the rod 9, and to be dropped off at a particularly designated point in a plant such as into a cleaning vat or laundry tub, or a dehydrator, or whatever the situation happens to require in the line of operation to which the materials are to be subjected in such a plant.

The releasing is effectuated by the release element 23 in accordance with the manner heretofore elucidated.

I believe, I have herein described rather succinctly the nature and the operation of the means employed to effectuate the results to be accomplished by my invention, and inasmuch as the same is susceptible of various modifications, I hereby reserve the right to all such modifications coming within the scope and spirit of my herein disclosure, as well as all modifications impliedly suggested by the accompanying drawings, and also those falling within the purview of the foregoing description.

Having thus described and revealed by invention, what I claim as novel and desire to secure by Letters Patent, is:

1. A device of the character described comprising, a guide bar member of key-like cross-sectional configuration providing one portion of a classifying combination; a clip element provided with a mating key-hole recess adapted to engage slidably the said cross-sectional configuration, the said clip element further provided with a hole in its body, a second hole substantially parallel to the said first-mentioned hole and terminating in an angularly bent recess providing a supporting ledge, and a bore transversal to the said second-mentioned bore and adjacent as well as merging with the said bent recess; a resilient pin element having a pointed leg, and a leg provided with a knee portion adapted to engage releasably the said ledge when the said pin is inserted with its legs astraddle the said holes in the said clip element.

2. A device of the character described comprising, a guide bar member of key-like cross-sectional configuration providing one portion of a classifying combination; a clip element provided with a mating recess adapted to engage slidably the said cross-sectional configuration, the said clip element further provided with a hole in its body, a second hole substantially parallel to the said first-mentioned hole and terminating in an angularly bent recess providing a supporting ledge, and a bore transversal to the said second-mentioned bore and adjacent as well as merging with the said bent recess; a resilient pin element having a pointed leg, and a leg provided with a knee portion adapted to engage releasably the said ledge when the said pin is inserted with its legs astraddle the said holes in the said clip element; and a releasing pin provided with a cam portion adapted to release the said knee portion from engagement with the said ledge when the said releasing pin is inserted into the said bore.

3. In a classifying system, a guide rod cut to key-like cross sectional configuration forming one portion of a classifying combination; a clip element provided with a mating key-hole recess adapted to be engaged slidably and removably on the said guide rod; and resilient pin means removably secured to the said clip element.

4. In a classifying system, a guide rod cut to key-like cross sectional configuration forming one portion of a classifying combination; a clip element provided with a mating key-hole recess adapted to be engaged slidably and removably on the said guide rod; resilient pin means removably secured to the said clip element; and pin release means provided with a cam portion adapted to release the said resilient pin means from engagement with the said clip element.

5. In a classifying system having in combination clip means releasably securing resilient pin means, pin release means provided with a cam portion adapted to release the said resilient pin means from engagement with the said clip means.

6. A device of the character described comprising, a guide bar member of key-like cross-sectional configuration providing one portion of a classifying combination; a clip element provided with a mating key-hole recess adapted to engage slidably the said cross sectional configuration, the said clip element further provided with a hole in its body, a second hole substantially parallel to the said first-mentioned hole and terminating in an angularly bent recess providing a supporting ledge, and a bore transversal to the said second-mentioned bore and adjacent as well as merging with the said bent recess; a resilient pin element having a pointed leg, and a leg provided with a knee portion adapted to engage releasably the said ledge when the said pin is inserted with its legs astraddle the said holes in the said clip element; and a releasing pin provided with a cam portion adapted to release the said knee portion from engagement with the said ledge when the said releasing pin is inserted into the said bore; the said guide bar being supported at one of its ends its other end being free to receive a multiplicity of clip elements.

WILLIAM CULVER.

REFERENCES CITED

The following references are of record in the file of this patent:

UNITED STATES PATENTS

| Number | Name | Date |
|---|---|---|
| 609,823 | Love | Aug. 30, 1898 |
| 891,885 | Wade | June 30, 1908 |
| 1,675,718 | Lynch | July 3, 1928 |
| 1,994,782 | Olson | Mar. 19, 1935 |